No. 744,903. PATENTED NOV. 24, 1903.
E. B. CAHOON.
FISH OR MINNOW TRAP.
APPLICATION FILED AUG. 22, 1903.
NO MODEL.
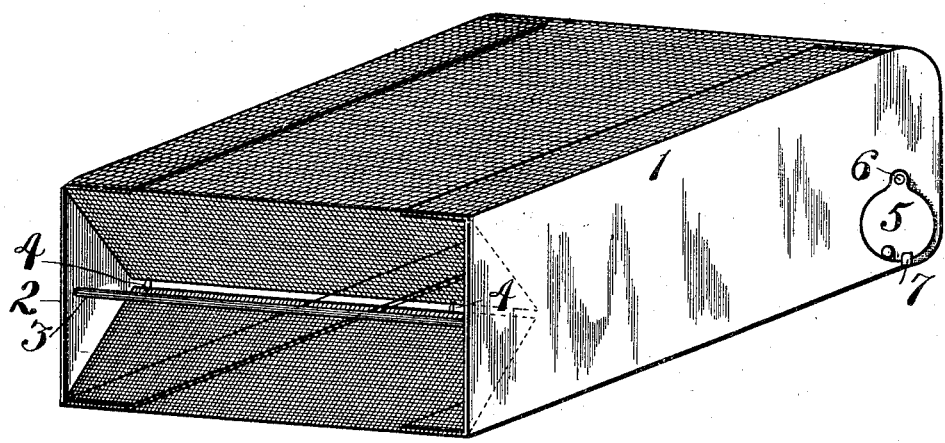
Witnesses,
Bessie Cook.
S. Earl Ritter.
Inventor,
E. B. Cahoon
by C. E. Humphrey.
Atty.

No. 744,903. Patented November 24, 1903.

UNITED STATES PATENT OFFICE.

EVERETT B. CAHOON, OF AKRON, OHIO.

FISH OR MINNOW TRAP.

SPECIFICATION forming part of Letters Patent No. 744,903, dated November 24, 1903.

Application filed August 22, 1903. Serial No. 170,381. (No model.)

*To all whom it may concern:*

Be it known that I, EVERETT B. CAHOON, a citizen of the United States, residing at Akron, in the county of Summit and State of Ohio, have invented a certain new and useful Improvement in Fish or Minnow Traps, of which the following is a complete specification.

This invention has relation to traps for catching fish and has a special relation to devices for catching minnows to be afterward used as bait for larger fish. Heretofore in the construction of this class of devices it has been the custom of the inventors to place within the trap for the minnows some suitable form of food with which to lure the fish into the trap. Experience has demonstrated that food is at best but an unsatisfactory means for attracting minnows into a trap, for the reason that at various times the minnows will fail to enter the trap, seemingly having no desire for food. Consequently those which depend upon the use of food as an allurement to the fish are by no means satisfactory and cannot be depended upon to furnish an adequate supply of minnows when desired. It has been found from the knowledge of this class of fish that upon the appearance of any object capable of frightening the minnows they will swim to the bottom of the stream and will seek the shadows cast from stones, weeds, &c., and as a rule they seek the deepest and darkest spots in the stream when so frightened. With this in view it is my object to furnish within the trap an artificial shadow which will tend to allure the fish within the body of the trap solely from these well-known characteristics of the fish when frightened. From this it will be seen that dependence need not be put on food, which is liable at any time to be washed away by the current and which may not be desired or sought for by the minnows at the time that the user of the trap is endeavoring to catch them.

The main object sought by my invention is to produce a trap which will capture minnows at any time of the day without regard to whether the minnows are in need of food or not.

To accomplish these objects my invention consists in the novel and peculiar construction, arrangement, and combination of parts hereinafter described, reference being had to the accompanying drawings, forming a part hereof.

In the drawing, which represents a perspective view of my improved minnow-trap, 1 and 2 are side plates preferably made of a noncorroding sheet metal. These sides 1 and 2 are generally made square at one end, with rounded corners at the opposite ends. The upper and lower sides of these side pieces 1 and 2 are bent inwardly at a right angle with the main portion thereof, thereby producing substantially a three-sided rectangular figure. In constructing this trap I place these side pieces 1 and 2 at determined or desired distances from one another, but parallel, with the inturned sides or edges pointing toward each other. I then fasten by means of solder or rivets a continuous strip of wire-netting to these side pieces, the ends of this netting being inturned and inclosed at an angle toward each other on the front or square end of the trap. Where the netting touches the side pieces 1 and 2 on the trap at the rounded end, bottom, and top it is permanently secured, but the inturned ends are free to be bent toward each other a greater or less degree, the amount of which is determined by the diameter of the opening which is to be used for catching the fish. For instance, if very small minnows are sought the opening is made correspondingly small. Extending across between the square ends of the sides 1 and 2 is a wire or rod 3, which serves as a handle by which the trap may be conveniently carried. In placing this handle 3 it is wholly included within the normal outside frame of the trap, so as to take as little space as possible, which is a very desirable feature when it is sought to ship these traps from one place to another. In order to retain the inturned ends of the wire-netting at a desired distance from one another, I customarily connect their ends by means of pieces of wire 4 or any suitable or preferred equivalent device. Near one of the rounded corners of the side 1 I place a gate 5, by which access is had to the interior of the trap for the purpose of removing the fish taken therein. This gate 5 swings on a pivot or bolt 6 freely, and it is held in place when closed by a guide 7, fastened to the side piece 1.

The operation of this device is as follows: The opening between the inturned ends of the wire-netting have been adjusted to the required size to catch a certain size of minnows. The operator then takes the trap and by wading upstream places it in the lowest or deepest spot readily reached in the stream with the inturned or square end of the trap pointing upstream, so that the current of water will flow into the trap from the end where the handle 3 is placed and out at the end where the gate 5 is located. The inturned edges of the sides 1 and 2 will cast a shadow into the interior body of the trap in whatever position the trap is placed without regard to the points of the compass. The operator then retreats down the stream from the place where the trap is located and from thence proceeds on the shore to a considerable distance above the trap and slowly and quietly walks down the stream, thereby driving the minnows ahead of him in the same manner that would be used in driving a flock of sheep. The minnows swimming ahead of the operator are all captured in the trap. If a great agitation of the water is practiced the minnows being too badly frightened will escape in all directions and but a few will be captured.

What I claim, and desire to secure by Letters Patent, is—

1. A trap for catching fish or minnows consisting of an inclosing frame a portion of which is made up of netting and the balance of an opaque substance and provided with a shadow-casting device.

2. A trap for catching fish or minnows consisting of side pieces of opaque substance having extending therefrom shadow-casting mechanism, said sides being connected and retained together by network.

3. A trap for fish or minnows made up partially of an opaque substance and network and an adjustable entrance for the admission of fish, a device for casting a shadow into the trap and a door to permit the removal of fish taken therein.

4. The combination in a trap for fish or minnows consisting of side pieces made up of an opaque material having extending therefrom shadow-casting devices, said side pieces being connected together by network, an entrance at one end of said trap for the admission of the fish made by inwardly inclining the ends of said network, and an escape-door at the opposite end of the said trap for the removal of the fish therefrom.

In testimony that I claim the above I hereunto set my hand in the presence of two subscribing witnesses.

EVERETT B. CAHOON.

In presence of—
WALTER BOWMAN,
C. E. HUMPHREY.